June 30, 1942.  J. H. BLANKENBUEHLER  2,287,929
MOTOR-GENERATOR SET AND GENERATOR
Filed June 23, 1939  2 Sheets-Sheet 1
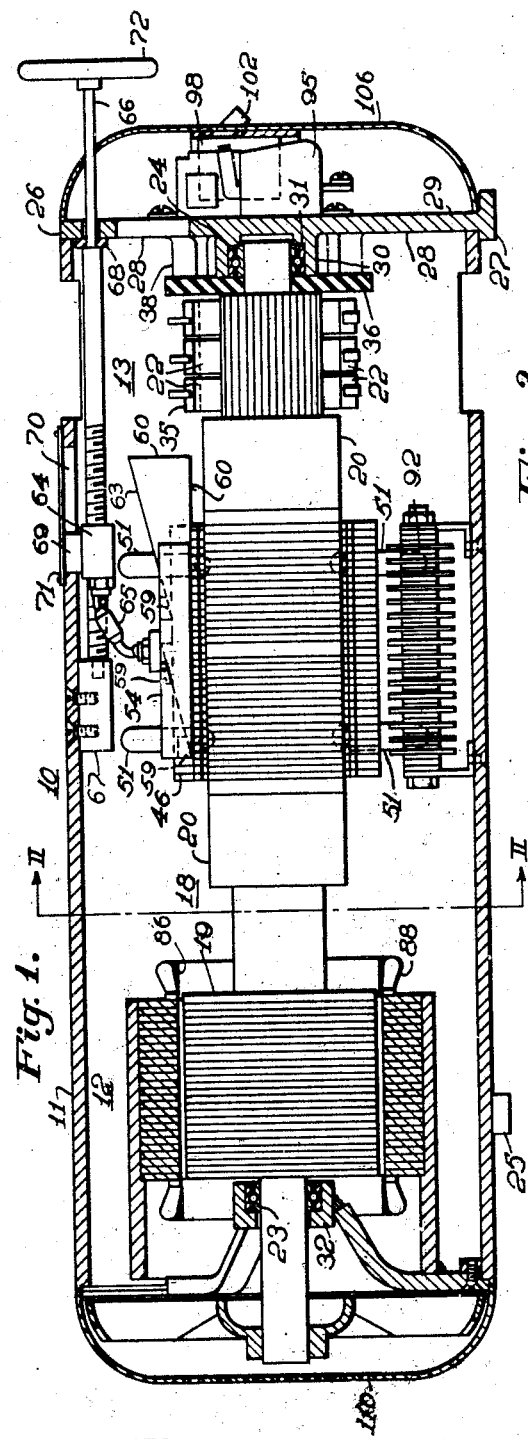
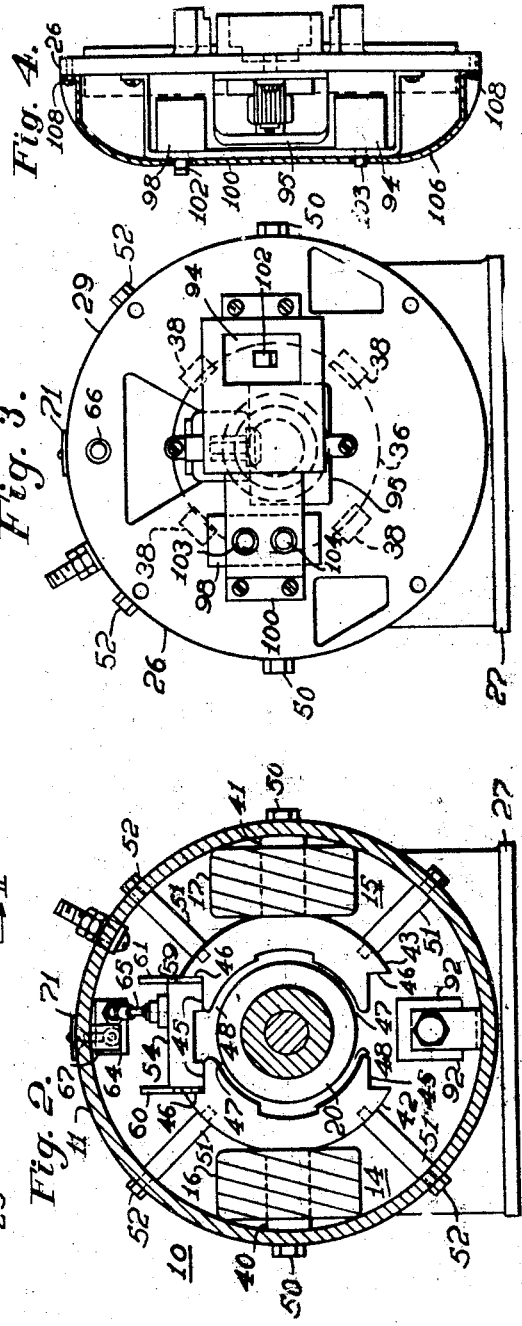
WITNESSES:
Edward Michaels
F. V. Giolma
INVENTOR
John H. Blankenbuehler
BY
[signature]
ATTORNEY

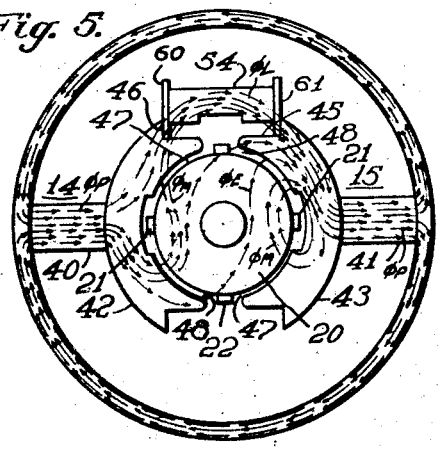
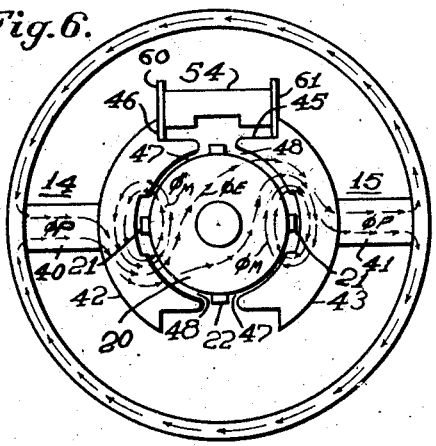
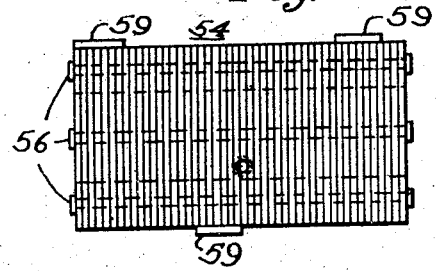
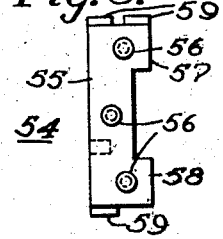
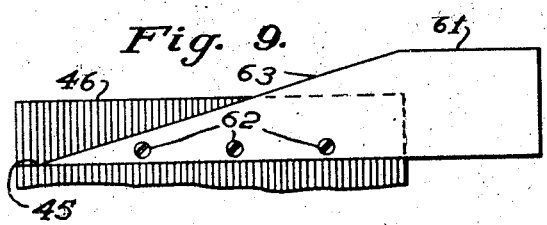
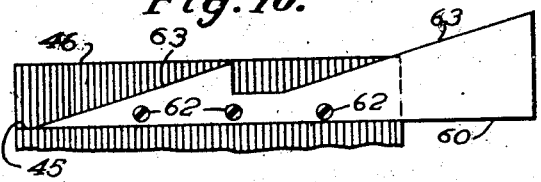
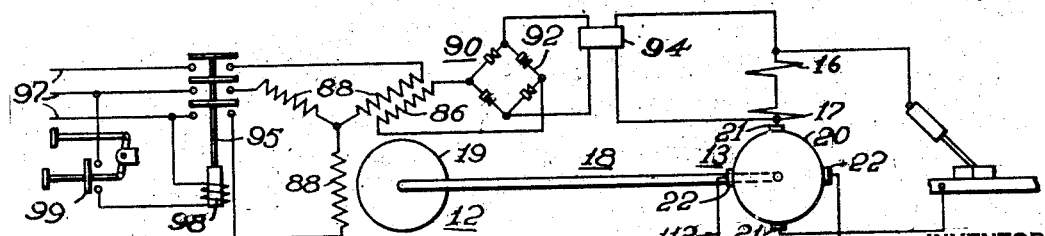

Patented June 30, 1942

2,287,929

UNITED STATES PATENT OFFICE 2,287,929

MOTOR-GENERATOR SET AND GENERATOR

John H. Blankenbuehler, Edgewood, Pa., assignor to Westinghouse Electric & Manufacturing Company, East Pittsburgh, Pa., a corporation of Pennsylvania Application June 23, 1939, Serial No. 280,687

6 Claims. (Cl. 171—123)

My invention relates, generally, to motor-generator sets and generators, and it has reference, in particular, to motor-generator sets and generators of the cross-field type for use in arc welding operation.

An object of my invention, generally stated, is to provide a motor-generator set or generator for use in arc-welding, which is simple and inexpensive to manufacture, and which is efficient and economical in operation.

An important object of my invention is to provide in a simple and effective manner for controlling the output of a cross-field welding generator over a wide range of current values.

Another object of my invention is to provide for controlling the output of a cross-field generator by utilizing a slidable magnetic shunt member positioned in bridged relation with the field poles of the generator.

Still another object of my invention is to provide for controlling the output of a cross-field welding generator by effecting movement of a magnetic shunt member, which bridges the adjacent portions of the field pole members, along a predetermined path in response to actuation of the member in a given direction.

Another important object of my invention is to provide in a simple and effective manner for regulating the output of a welding generator of the cross-field type, so as to secure a wide range of output control without requiring a complicated operating mechanism.

A further object of my invention is to provide in a simple and effective manner for mounting the motor and generator controls of a motor-generator welding power unit in associated relation on an end member of the unit behind a protective cover which blends with the outline of the unit.

Other objects will, in part, be obvious, and will, in part, appear hereinafter.

In one embodiment of my invention, the motor-generator power unit comprises a common elongated tubular frame formed of a length of pipe, or the like, having a motor stator structure mounted therein adjacent one end, a field structure for a generator, which is preferably of the cross-field type, positioned therein adjacent the other end, and a rotor member comprising a motor rotor and a generator armature positioned in rotatable relation thereto. A magnetic shunt member is positioned between the adjacent shoe portions of the opposing field pole members of the generator field structure and actuated by means of a traveling nut indicator member on an axially disposed threaded rod which may extend from the generator end of the frame and be provided with operating means such as a handwheel. The movement of the shunt member relative to the shoe portions is preferably controlled by means of guide members which support the shunt member on bearing surfaces which may have any desired slope, or contour, so as to effect a predetermined movement of the shunt member with respect to the pole shoes in response to operation of the actuating means.

The common frame may be provided with an end member at the generator end which not only supports one end of the rotor member of the machine but which also serves as a mounting for switches of various kinds, such, for example, as a control switch for controlling the terminal polarity of the generator, and a line switch for controlling the energization of the motor. By thus positioning these control devices they are not only adjacent the output control handwheel of the generator, but they are also made as free from vibration as possible, and readily accessible, and may be protected and concealed by a metal end cover harmonizing with the outlines of the unit.

For a more complete understanding of the nature and scope of my invention, reference may be made to the following detailed description, taken in connection with the accompanying drawings, in which:

Figure 1 is a longitudinal section view of a motor-generator unit embodying one form of my invention;

Fig. 2 is a cross-section view of the unit of Fig. 1 along the line II—II showing details of the generator construction;

Fig. 3 is an end elevation view of the motor-generator unit of Fig. 1 from the generator end with the protective end cover removed;

Fig. 4 is a side elevational view of the generator end member with the protective cover sectioned, showing details of the mounting of the motor and generator switches;

Fig. 5 is a diagrammatic view of the magnetic circuits of the generator showing the main flux paths under load conditions;

Fig. 6 is a diagrammatic view showing the flux distribution in the generator when the load is removed;

Fig. 7 is an enlarged plan view of the magnetic shunt member;

Fig. 8 is an enlarged end view of the magnetic shunt member of Fig. 7;

Figs. 9 and 10 are enlarged side elevation views of the guide members mounted on the shoe members;

Fig. 11 is a schematic diagram showing the circuit connections of the motor-generator unit of Fig. 1, and Fig. 12 is a fragmentary plan view of the indicating means.

Referring particularly to Figs. 1 and 2 of the drawings, the reference numeral 10 denotes, generally, a motor-generator welding power unit comprising a tubular frame 11, which may be formed of a length of pipe, or the like, with an alternating-current motor stator structure 12 positioned therein at one end, and a generator field structure 13, comprising oppositely positioned field pole members 14 and 15, with field windings 16 and 17 disposed thereon, positioned therein at the other end. A common rotor member 18 comprising a motor rotor 19 and a generator armature 20 having main brushes 21 (not shown in these views but which are shown in Figs. 5, 6 and 11) and close-circuited auxiliary brushes 22, is positioned in rotatable relation therein by means of the bearings 23 and 24. Suitable means, such as the support member 25, may be secured to the under side of the frame 11 to support the motor end thereof, and an end member 26 may be secured to the frame 11 at the generator end, having a downwardly extended flanged portion 27 for supporting the generator end of the frame.

As illustrated in Fig. 1 of the drawings, the end member 26 may be secured to the generator end of the tubular frame 11 by suitable means. The end member 26 may be provided with a substantially flat outer face 29 and have a boss 30 on the inner face, with a recess 31 therein for receiving the bearing 24, so as to support the generator end of the rotor member 18. The motor end of the rotor member 18 may be supported by positioning the bearing 23 in a bearing housing 32, which is an integral part of the removable motor unit structure 12, the details of construction of which are clearly disclosed in the copending application of John H. Blankenbuehler and Theodore C. Fockler, Serial No. 280,689, filed June 23, 1939. Further details of the generator structure are disclosed in the copending application of John H. Blankenbuehler and William R. Harding, Serial No. 280,688, filed June 23, 1939.

In order to support the main brushes 21 and the auxiliary brushes 22 in the proper operating relation to each other and to the commutator of the generator armature 20, brush holders 35 may be secured to an insulating support ring 36 which may be supported in any suitable manner by means, such as the projections 38 on the inner face of the end member.

Since the generator used in this embodiment of my invention is of the cross-field type, in which the main or cross-field flux links the armature and the shoe portions of the field poles only, and but a limited number of flux lines pass through the body portion of the field poles, the field pole members 14 and 15 may comprise body members 40 and 41, and separate arcuate shoe members 42 and 43. As only a limited number of magnetic flux lines pass through the body members, they need not be laminated and may, for example, be formed from solid blocks of soft iron, or the like, having a relatively small cross-section. The arcuate shoe members 42 and 43 are preferably laminated and of a substantial cross-section, so as to provide a relatively low reluctance path for a transverse cross-field flux therein. They may be notched at the tips to provide adjoining edge surfaces 45 and 46 which are substantially normal to each other, and the arcuate surfaces adjacent the armature 20 may be so arranged that the air gaps 47 at the leading edges thereof are smaller, and the air gaps 48 at the trailing edges are a like amount larger, than the normal value of air gap used in machines of the cross-field type.

The shoe members may be secured to the body members in any suitable manner, such as by means of bolts 50, which pass through the frame 11 and the body members, and are threaded into the shoe members to secure the shoe members and the body members together, and to the frame. Inasmuch as the body members 40 and 41 are of relatively small cross-section, while the arcuate shoe members 42 and 43 are relatively large, suitable stay members 51 may be provided for bracing the field poles. For example, the stay members 51 may comprise lengths of tubing of a non-magnetic material such as brass, or the like, used as spacers on bolts 52, which are also preferably of a non-magnetic material, and pass through the frame and are threaded into the shoe members.

As may be seen from Figs. 1, 2, 7 and 8, a magnetic shunt member 54 is positioned in bridged relation between the adjacent edges of the shoe members 42 and 43 for varying the output of the generator by varying the magnetic reluctance of the leakage path therebetween. The shunt member 54 may, for example, comprise a stack of similarly shaped laminations 55 of magnetic material secured together by means of rivets 56 to provide an elongated, channel-shaped member, with depending edge portions 57 and 58, which are disposed to engage the substantially horizontal end surface portions 45 of the shoe members when the shunt member is in its lowest position. Suitable support means, such, for example, as the projecting bearing members 59 may be secured to the sides of the shunt member 54 to provide for supporting the shunt member.

Referring to Figs. 1, 2, 9 and 10, it may be seen that guide members 60 and 61 are provided for supporting the shunt member 54 in operating relation with the shoe members 30 and 31 in order to permit the widest range of variation in the magnetic reluctance of the leakage path between the pole shoes, the guide members 60 and 61 are preferably of a non-magnetic material such as brass and may comprise substantially flat plates thereof, adapted to be secured to the substantially vertical end surfaces 46 of the shoe members by means of screws 62.

The guide members 60 and 61 are provided with sloping bearing surfaces 63 on the upper edges thereof, on which the bearing members 59 of the shunt member may rest, so as to support the shunt member thereon. In order to assist positioning and properly aligning the shunt member 54 on the guide members 60 and 61, the guide members 61 may, for example, be provided with a single sloping bearing surface 63, and the guide member 60 may be provided with two such bearing surfaces. The shunt member 54 may likewise be provided with two bearing members 59 on one side and a single one on the other, corresponding with the bearing surface of the guide members, to afford three points of support for the shunt member. In this manner, the shunt member will be stable in all positions, regardless of variations in the alignment of the bearing surfaces 63 within reasonable manufacturing tolerances.

In order to move the shunt member along the bearing surfaces 63 of the guide members 60 and 61 and vary its position relative to the shoe members 42 and 43, suitable operating means may be provided, such for example, as the traveling nut member 64 which may be operatively connected to the shunt member 54 by means of a universal coupling member 65. The traveling nut member 64 may be positioned on a threaded shaft 66 which is rotatably mounted in the frame 11 by a bearing block 67 attached to the interior of the frame, and a suitable bushing 68 in the end member 26, through which the shaft projects. The nut member 64 may be provided with an upstanding projection 69 which extends through a slot 70 in the frame 11, for preventing rotation of the nut member, and indicating the output setting of the generator for each position of the shunt member on a suitable scale 71 which may be attached to the frame. Means such as the handwheel 72 may be provided for rotating the shaft 66 to effect movement of the nut member 64 therealong and vary the position of the shunt member 54 relative to the shoe members, so as to alter the output of the generator.

By suitably shaping the bearing surfaces 63 of the guide members, and making them either plane or curved, as desired, the shunt member 54 may be caused to move along any desired predetermined path in response to actuation of the handwheel 72. As the shunt member is urged in the longitudinal or axial direction of the generator, by the traveling nut 64, it will be apparent from Fig. 1 that as the shunt member moves to the right, from the position of minimum leakage reluctance as shown, the proportion of the shunt member 54 positioned between the shoe members 42 and 43 will be reduced, thus increasing the reluctance of the leakage path therebetween. In addition, as the shunt member 54 is moved to the right, the bearing members 59 which rest on the sloping bearing surfaces 63 of the guide members 60 and 61, will raise the shunt member so that instead of the depending edges 57 and 58 thereof resting on the horizontal edge portions 45 of the shoe members 42 and 43, they will be raised therefrom, thus additionally increasing the magnetic reluctance of the leakage path between the shoe members. Accordingly, it will be apparent that a wider range of variation in the magnetic reluctance of the leakage path may be obtained by this arrangement of the shunt member, without requiring undue movement of the shunt member in any direction. Thus full advantage is taken of the limited space available within the frame of the generator for movement of the shunt member, without requiring complicated shunt operating mechanisms. As the surfaces 63 on which the shunt member is supported are slidably engaged by the bearing members 59 of the shunt member, and as the depending edges 57 and 58 of the shunt member slidably engage the horizontal surface portion 45 of the shoe members in the position of minimum reluctance as shown in Fig. 1, these surfaces are wiped clean by operation of the shunt member, so that the calibration of the generator will not be affected by dirt settling on these surfaces, but will remain constant.

Referring to Fig. 5 of the drawings which represents the flux paths under load conditions in a cross-field generator embodying my invention, it will be apparent that the flux designated by the dotted lines $\phi_P$ in the body members 40 and 41 of the field poles must equal the sum of the excitation flux indicated by the dotted lines $\phi_E$ traversing the armature 20 and the leakage flux indicated by the dotted lines $\phi_L$ which passes through the shunt member 54. By adjusting the position of the shunt member 54 relative to the shoe members 42 and 43 the magnetic reluctance of the leakage path therebetween is varied, and the leakage flux $\phi_L$ is also varied. As the flux $\phi_P$ is substantially constant throughout the operating range of the generator, because the restricted cross-section of the body members 40 and 41 results in magnetic saturation thereof, any variation of the leakage flux $\phi_L$ will effect a change in the excitation flux $\phi_E$ in the opposite sense. The circulating current $i$ induced thereby in the auxiliary brush circuit of the generator armature 20 will be likewise varied, and the cross-field or main flux $\phi_M$ which is produced thereby, will be altered accordingly, so as to change the voltage induced thereby between the main brushes 21 of the generator, thus varying the output of the generator.

Referring to Fig. 6 of the drawings, it may be seen that the shunt member 54 diverts relatively little flux from the armature under no load conditions, since the excitation flux $\phi_E$ passes into the armature from the lower portion of the pole shoes 42, and there is no tendency for it to pass through the shunt member. The open circuit voltage of the generator is, therefore, retained at a relatively high value even at low output settings, thus facilitating the striking of the arc. Under load conditions, the field windings 16 and 17 increase the flux in the body members 42 and 43 of the field poles so that it combines in part with the flux $\phi_M$, as shown in Fig. 5, and the shunt member 54 may be adjusted to shunt a large proportion of both of the said fluxes about the armature so as to control the excitation flux $\phi_E$ in the armature, and thus vary the voltage across the main brushes 21, so as to control the output of the generator.

In order to provide for controlling the terminal polarity of the cross-field welding generator, an auxiliary motor winding 86 is provided in coupled relation with the main stator winding 88 of the alternating current motor unit structure 12, and connected as illustrated in Fig. 11, to rectifying means, such as the bridge circuit 90 of unidirectional current devices 92, which may be conveniently mounted in the lower portion of the frame 11, between the field poles 14 and 15, so as to provide a direct current polarity control potential which may be selectively applied to the field windings 16 and 17 of the generator through the reversing switch 94 to determine the polarity of the terminals thereof as desired. A suitable line switch 95 may be provided for controlling the connection of the main motor windings 88 to a source of alternating current 97, having an operating winding 98 which is energized through a pushbutton switch 99.

In order to provide a compact and efficient arrangement of the controls for readily controlling the operation of the motor-generator unit, the control switches for the motor and the generator may be mounted on the end member 26 in any suitable manner. The line switch 95 may, for example, be mounted directly on the outer face of the end member 26, in a manner such as shown in Figs. 1, 3 and 4 of the drawings. The control switch 94 and the pushbutton switch 99 are preferably also mounted on the end member adjacent the line switch, being, for example, supported thereon by a bracket member 100 which is secured to the end member 26, so that the operating buttons 102, 103 and 104 thereof project through openings in a dished metal protective cover 106, which is secured to the end member in any suitable manner, as by means of screws 108 A similarly shaped cover 110 is preferably secured to the other end of the frame 11, both covers being preferably of substantially the same diameter as the frame 11, so as to harmonize therewith and conceal the control switches without requiring integral cast switch enclosures or expensive machining of the frame to position the control therein, and without rendering the control less accessible for inspection and repair. As the outer face of the end member 26 is substantially flat, and the flanged base 27 projects outwardly therefrom, by thus mounting the control switches, they are mounted substantially within the zone of support of the end member. Thus vibration and jarring of the control switches is reduced to a minimum, and their operation is rendered more reliable than when they are mounted on the frame of the set in an exposed position, and distant from a point of support of the motor-generator set so that the effect of shocks and vibrations on the control switches is magnified.

Since the field windings of a generator of the cross-field type are normally connected in series-circuit relation with the main brushes and the load circuit, which comprises only the welding cables, the electrode, and the work, they are normally deenergized when the generator is running at no-load. The open circuit voltage across the main brushes of the cross-field generator is then dependent entirely on the residual magnetic flux in the field pole members, so that its terminal polarity may become reversed either because of the application of some external force, such as may result upon the connection of its welding electrode with the welding electrode of another generator having a higher open circuit voltage, or through an internal transient condition.

By applying a polarity controlling potential to the field windings 16 and 17 of the generator through the reversing switch 94, in the manner hereinbefore explained, the residual magnetomotive force of the body members 40 and 41 of the field poles is increased, so that should the polarity of the reversal of the residual magnetic flux generator become reversed by accident, it will be automatically returned to the rect polarity by the polarity controlling potential, upon the removal of the external force, or the termination of the internal transient condition, thus maintaining the desired terminal polarity of the generator.

Referring to Fig. 6 of the drawings, it may be seen that inasmuch as the auxiliary brushes 21 of the cross-field generator are close-circuited by the conductor 112, a circulating current $i$ will be induced in the auxiliary brush circuit when the generator is running under no-load conditions, by the residual magnetic flux or the excitation flux, which is represented by the dotted line $\phi_E$. Since the value of this circulating current under no-load conditions is directly dependent upon the residual magnetism of the field pole members, or the flux $\phi_E$, it will be apparent that the application of a polarity control potential to the field windings 16 and 17 of the generator which will tend to increase the no-load value of the flux $\phi_E$, will correspondingly tend to increase the circulating current in the auxiliary brush armature circuit.

By providing the arcuate pole shoe members 42 and 43 with stepped arcuate portions adjacent the armature, so that the air gaps 47 at the leading portions of the pole shoes are increased, and the air gaps 48 at the trailing portions of the pole shoes are decreased, a like amount from the value of the uniform air gap normally used in a cross-field generator of this type, the tendency for any increase in the excitation flux $\phi_E$, because of the polarity control excitation, is prevented. Since both of the air gaps 47 in the path of the excitation flux $\phi_E$ are increased, the magnetic reluctance of this flux path is increased, preventing any increase in the no-load value of the flux $\phi_E$, even though the no-load magnetomotive force acting on the field poles 14 and 15 is increased by the field windings 16 and 17 of the generator being provided with auxiliary polarity controlling excitation. The harmful effects of an increase in the no-load circulating current in the auxiliary brush armature circuit are thereby avoided.

Since the voltage across the main brushes 21 of the generator is produced by the armature conductors cutting the cross-field flux, which is indicated by the dotted lines $\phi_M$, and which circulates through the arcuate shoe members 42 and 43, and the flux $\phi_M$ of each field pole includes in its path both the increased and the decreased air gaps 48 and 47 at the trailing and leading portions of the shoe members, respectively, no change in this flux is effected by this arrangement of air gaps, and, accordingly, the voltage across the main brushes 21 is unaffected.

From reference to the accompanying drawings and the above description, it will be apparent that by my invention I have provided a motor-generator set or a generator of the cross-field type wherein the output may be controlled in a simple and effective manner, and have provided a construction therefor that is compact and efficient, and is easy to manufacture. The calibration of the output control is permanent and the control is protected from shock and vibration, and concealed from the eye so that the power unit has a pleasing appearance.

Since certain changes may be made in the above description, and different embodiments of the invention may be made without departing from the spirit thereof, it is intended that everything shown in the accompanying drawings and all matter contained in the above description shall be considered as illustrative, and not as a limitation.

I claim as my invention:

1. The combination with a generator comprising, a frame with oppositely positioned field pole members secured within the frame, of a slidable magnetic shunt member disposed to bridge adjacent pole tips of the oppositely positioned field-pole members, adjusting means operable in the axial direction for effecting movement of the shunt member and indicating the output of the generator for different positions of the shunt member, and guide means positioned within the frame having bearing surfaces to support the shunt member so shaped as to guide it radially away from the pole tips as well as axially in response to operation of the adjusting means.

2. The combination in a generator, of a frame, a pair of oppositely disposed field-pole members positioned within the frame, an armature rotatably positioned between the field-pole members, a slidable magnetic shunt member bridging adjacent pole tips of the oppositely disposed field-pole members, a rotatable shaft member having a traveling nut member positioned thereon and operatively connected to the shunt member for effecting axial movement of the shunt member, and fixed guide means secured to the field-pole members having bearing surfaces so angularly related to the adjacent edges of the pole tips as to support the shunt member and direct it axially along and radially in a direction perpendicular to the pole tips in response to operation of the adjusting means to provide a variable air gap between the magnetic shunt member and a part of the pole tips.

3. In a motor-generator set, the combination, of a unit frame, a plurality of generator field pole members having windings positioned within the frame in opposed relation adjacent one end thereof, a motor stator having a main winding secured within the other end of the unit frame, an auxiliary motor winding inductively coupled with the main winding, circuit means connecting the auxiliary winding to one of the generator windings to control the no-load polarity of the flux in the field pole members, a slidable magnetic shunt member for controlling the output of the generator supported by inclined guide members on adjacent pole tips of the opposed field pole members within the frame, means for operating the shunt member along the guide members to control the flux in the field pole members and indicating the output of the generator, and control means controlling the energization of the main and auxiliary windings of the motor and the connection of the auxiliary motor and generator field windings mounted on the end member in association with the said adjusting means for controlling the operation of the motor-generator set.

4. A generator comprising, a pair of oppositely positioned field pole members having field windings positioned in a frame, an armature rotatably positioned between the field pole members, a magnetic shunt member bridging the field pole members having means for slidably moving said member in an axial direction relative to the armature and field pole members, and guide means slidably supporting the shunt member having surfaced portions so inclined to the longitudinal axis of the generator as to direct the shunt member radially away from the field pole members as well as axially of the armature in response to operation of the said means.

5. The combination with a generator having oppositely positioned field pole members with field windings and an armature rotatably supported therebetween, of a slidable magnetic shunt member positioned between the field pole members, operating means connected to the shunt member to move it relative to the field pole members along the axis of the armature, and fixed guide members secured to the field pole members slidably supporting the shunt member having bearing surfaces so shaped and inclined to the longitudinal axis of the armature as to effect movement of the shunt member radially away from the field pole members as well as axially of the machine in response to operation of the operating means to provide air gaps between the shunt member and the field pole members which vary with the degree of overlap of the shunt member and field pole members.

6. The combination with a dynamo-electric machine having oppositely positioned field pole members with field windings positioned in a frame and an armature rotatably supported therebetween, of a movable shunt member positioned between adjoining tips of adjacent field pole members, control means operatively connected to the shunt member to urge it in an axial direction between the field pole members, and guide members positioned within the frame having curved bearing surfaces for guiding the shunt member so inclined to the longitudinal axis of the generator as to impart a predetermined radial movement to the shunt member away from the adjoining pole tips as well as axially in the direction of the longitudinal axis of the generator in response to operation of the control means.

JOHN H. BLANKENBUEHLER.